United States Patent
Haeussermann et al.

(10) Patent No.: US 11,199,461 B2
(45) Date of Patent: Dec. 14, 2021

(54) PRESSURE SENSOR STACKING ARRANGEMENT, MEASURING DEVICE AND METHOD FOR THE PRODUCTION THEREOF

(71) Applicant: Robert Bosch GmbH, Stuttgart (DE)

(72) Inventors: Conrad Haeussermann, Trochtelfingen (DE); Florian Guffarth, Reutlingen (DE); Lars Sodan, Balingen (DE); Vicente Amor Burgos, Gomaringen (DE); Vijaye Rajaraman, Villach (AT)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 16/633,462

(22) PCT Filed: Jul. 20, 2018

(86) PCT No.: PCT/EP2018/069810
§ 371 (c)(1),
(2) Date: Mar. 30, 2020

(87) PCT Pub. No.: WO2019/020529
PCT Pub. Date: Jan. 31, 2019

(65) Prior Publication Data
US 2020/0386643 A1    Dec. 10, 2020

(30) Foreign Application Priority Data
Jul. 26, 2017 (DE) .......................... 102017212866.6

(51) Int. Cl.
*G01L 9/00* (2006.01)
*G01L 19/06* (2006.01)
*G01L 19/14* (2006.01)

(52) U.S. Cl.
CPC .......... *G01L 9/0055* (2013.01); *G01L 9/0042* (2013.01); *G01L 19/0627* (2013.01); *G01L 19/14* (2013.01)

(58) Field of Classification Search
None
See application file for complete search history.

(56) References Cited

U.S. PATENT DOCUMENTS 5,285,690 A * 2/1994 Koen .................... G01L 9/0042
29/621.1
6,311,561 B1   11/2001 Bang
(Continued)

FOREIGN PATENT DOCUMENTS

DE        10050364 A1   9/2001
DE     102004036035 A1   7/2005
(Continued)

OTHER PUBLICATIONS

International Search Report for PCT/EP2018/069810, dated Dec. 7, 2018.

*Primary Examiner* — Andre J Allen
*Assistant Examiner* — Jermaine L Jenkins
(74) *Attorney, Agent, or Firm* — Norton Rose Fulbright US LLP; Gerard Messina

(57) ABSTRACT

A pressure sensor system having at least one pressure sensor device. The pressure sensor device has a stack having a ceramic substrate, at least one signal processing element, and at least one sensor element. The pressure sensor device is placed in a sensor housing provided with a membrane, and a residual volume of the sensor housing provided with the membrane is filled with an incompressible fluid. A method for producing such a pressure sensor system, and to a measuring device, are also described.

13 Claims, 3 Drawing Sheets

(56) References Cited

U.S. PATENT DOCUMENTS

| | | | |
|---|---|---|---|
| 6,577,244 B1 | 6/2003 | Clark | |
| 6,938,490 B2 | 9/2005 | Wagner | |
| 10,060,812 B2* | 8/2018 | Lemery | G01L 19/0084 |
| 2008/0192967 A1* | 8/2008 | Chan | H04R 25/609 |
| | | | 381/312 |
| 2015/0001650 A1* | 1/2015 | Matsunami | G01L 9/0045 |
| | | | 257/417 |
| 2016/0377496 A1* | 12/2016 | Chiou | G01L 19/0007 |
| | | | 73/727 |

FOREIGN PATENT DOCUMENTS

| | | |
|---|---|---|
| DE | 102005045380 A1 | 4/2006 |
| DE | 102007005862 A1 | 8/2008 |
| DE | 102008028757 A1 | 12/2009 |
| DE | 102012210752 A1 | 1/2014 |
| EP | 1810947 A1 | 7/2007 |
| JP | 2004045076 A | 2/2004 |
| JP | 2005505764 A | 2/2005 |
| JP | 2014006254 A | 1/2014 |

* cited by examiner

PRESSURE SENSOR STACKING ARRANGEMENT, MEASURING DEVICE AND METHOD FOR THE PRODUCTION THEREOF

FIELD

The present invention relates to a pressure sensor system having at least one pressure sensor device, and to a method for producing a pressure sensor system having at least one pressure sensor device. Moreover, the present invention relates to a measuring device in which at least one such pressure sensor system is integrated.

BACKGROUND INFORMATION

Conventional pressure sensor systems may have micromechanically processed electronic pressure sensors (MEMS pressure sensors), having at least one deformable pressure-sensitive membrane that is typically exposed to the surrounding media that is of interest, in order to continuously measure and monitor the pressure there. While, for example, in consumer electronics applications (for example a mobile radiotelephone) the measurement of the atmospheric pressure requires only a stable sensor module inside a protective housing, in industrial or automotive applications the same electronic pressure sensor has to be used with an insulating medium (such as a gel or oil) as additional protection against dust, particles, moisture, or exhaust gases, as well as other corrosive or aggressive media.

Solutions to the problem of meeting the challenge of media insulation by forming a robust module are described in, for example, U.S. Pat. No. 6,311,561 B1, U.S. Pat. No. 6,577,244 B2, and U.S. Pat. No. 6,938,490 B2.

In gel-filled sensors, if these are exposed to corrosive or aggressive media such as exhaust gases it can turn out to be disadvantageous that, despite the protection, the relevant gases continue to contact the gel, and can corrosively attack metallic compounds of the MEMS pressure sensor, its ASIC, and the substrate. As a result, the reliability and functionality thereof can be impaired over the long term. For this reason, both the active region of the MEMS sensor (such as its piezoresistors) and the ASIC (Application Specific Integrated Circuit; signal processing electronics) should not be exposed to such aggressive media. In addition to such problems of reliability, in the mentioned gels it is also a concern that at pressures above 5 bar they may tend to form bubbles and/or foam. The use of a buffer formed by an oil instead of by a gel is a suitable alternative here, in applications with required media insulation of components of the sensor system.

SUMMARY

In conventional applications of oil-filled pressure sensors, steel membranes are typically used that seal a plastic or metal housing, in which the sensor element is situated in order to determine pressure and is surrounded by an incompressible oil in order to communicate the pressure force. Such pressure sensors are highly resistant to the aggressive media, but are expensive to produce.

The present invention provides an example pressure sensor system that has at least one pressure sensor device that is designed on the one hand to be robust or protected against aggressive media, while on the other hand permitting a simple temperature compensation in order to compensate the influence of the oil filling via the temperature, and that in addition can be produced at low cost. In addition, temperature changes of a housing of the pressure sensor system will not cause any significant impairment of or influence on the sensor element of the pressure sensor system.

In accordance with the present invention, the example pressure sensor system is provided with a pressure sensor device that has a stack having a ceramic substrate, at least one signal processing element, and at least one sensor element. The pressure sensor device is housed in a sensor housing provided with a membrane, and a residual volume of the sensor housing provided with the membrane, and closed by it, is filled with an incompressible fluid.

Accordingly, the present invention provides protection for the pressure sensor device against aggressive media, in a suitable manner and in particular using simple means and at low cost.

Given the use of a suitable sensor element, the pressure sensor device can be compensated already before being placed in the pressure sensor housing, individually but also in batches simultaneously. Through the ceramic substrate, the signal processing element and/or the sensor element can be thermally decoupled from the sensor housing.

Because the sensor housing can be made in particular of a metal, and the signal processing element and/or the sensor element can be made in particular of silicon or can contain silicon, the ceramic substrate can also compensate or attenuate a difference in the coefficients of expansion of these materials. Thus, the ceramic substrate can also be referred to as a compensating element.

The signal processing element (in particular an ASIC) can provide various basic functions already integrated into its electronics; for example, it is responsible for supplying voltage to the sensor element, evaluates its voltage signal and possibly its temperature signal, and in addition carries out a correction of the characteristic curve of the pressure measurement; in addition, it can be provided with filters and signal processing electronics, as well as diagnostic and error recognition functions. Through digitization at the input side, the ASIC can enable an overall digital signal processing (for example for the bridge signal of the resistors), and can also trigger the data transmission via an internal clock. It can for example also be connected directly to a control device.

Further advantageous features are of the present invention are described herein.

In some advantageous embodiments of the pressure sensor system according to the present invention, the at least one signal processing element is sandwiched between the ceramic substrate and the at least one sensor element, so that a particularly compact configuration results having short signal paths and simplified production.

In some advantageous embodiments of the present invention, the sensor element can be provided and set up as an APSM (Advanced Porous Silicon MEMS) sensor element. Here, the sensor element is advantageously produced in an APSM (Advanced Porous Silicon Membrane) process in which a monocrystalline start layer is produced for the later membrane. This membrane is subsequently undercut using an etching method, and a porous silicon layer is produced in a location where a cavity will subsequently be. After this, a monocrystalline silicon layer is epitactically applied, which later forms the sensor element membrane. Through temperature loading (atomic rearrangement), a cavity under vacuum is created that later permits the absolute pressure measurement. Piezoresistors attached to the membrane then measure the bending of the membrane. Using this APSM process, described for example in DE 10 2004 036 035 A1 and EP 1810947 B1, a robust membrane can be created; in addition, this process advantageously uses purely surface mechanical processing. The resulting monocrystalline layer is absolutely tight and stable. However, the sensor element can also be designed differently, for example as a so-called stress-decoupled sensor element.

In further advantageous embodiments of the present invention, additional passive electrical structures or components can be provided on the pressure sensor system according to the present invention, placed in the substrate thereof. Already described above is the sensor element membrane made of a monocrystalline silicon layer on which resistors can be situated; these can for example be diffused onto the layer, so that, as a function of the deformation of the sensor element membrane, a change in resistance develops under load; here the resistors are wired as a Wheatstone bridge. Because no voltage is produced here, but rather only the electrical resistance is changed by the change in pressure, these are passive elements or structures whose functional relationship to temperature can also be eliminated by the bridge circuit. Such sensors have a relatively high sensitivity and can be produced at favorable costs.

In order to advantageously enable protection of the membrane of the pressure sensor device, which receives and communicates the applied pressure, from undesirable mechanical influences such as pressure peaks in a volume flow that is to be measured, according to some advantageous developments of the present invention, a mechanical protective element can be situated on the pressure sensor system on the side of the membrane facing away from the sensor housing, the element substantially indirectly covering the membrane. This can for example be an interrupted plate, or a kind of grate, extending substantially parallel to the membrane and connected to the housing. The relevant openings permit access of the medium to be measured to the membrane, whose pressure loading can then be communicated to the sensor element membrane. However, other realizations are also possible.

Protecting the sensor element from aggressive and/or corrosive media in a suitable manner, the incompressible fluid can be realized as oil, for example synthetic oil. After situating the pressure sensor device inside the pressure sensor housing, the remaining, residual volume can advantageously be filled with the relevant incompressible fluid before closing the housing with a membrane or some other closure, so that protection on all sides is ensured of the sensor element or pressure sensor device. The use of other incompressible media, for example other suitable oils, is also possible.

In an advantageous development of the example pressure sensor system according to the present invention, the design of the oil buffer is also important, which advantageously provides the positioning of the pressure sensor device inside the pressure sensor housing in such a way that the sensor element is permanently exposed to an isostatic pressure due to being embedded on all sides in the oil buffer, so that in this way as well physical damage to the pressure sensor device can be reliably prevented.

The present invention also provides an example method for producing a pressure sensor system, having at least the following method steps:
  producing the pressure sensor device, including stacking a ceramic substrate, a signal processing element, and a sensor element;
  placing the pressure sensor device in a pressure sensor housing that is to be provided with a membrane;
  filling a residual volume that remains after the placing of the pressure sensor device inside the pressure sensor housing with an incompressible fluid; and
  closing the pressure sensor housing with a membrane.

The example method also suitably ensures protection for a pressure sensor device against aggressive media, in a suitable manner and in particular using simple means and at low cost. Given the use of a suitable sensor element, the pressure sensor device can be compensated already before being situated in the pressure sensor housing, individually but also in batches simultaneously.

In an advantageous variant of the example method according to the present invention, the pressure sensor device with the sensor element can be compensated with regard to temperature before being embedded in the pressure sensor housing, so that, in a pressure sensor system, an already-compensated pressure sensor device can be used immediately, or at any time, and in addition can be provided at low cost, because if the parameters are known this compensation can be carried out at the pressure sensor device for many pressure sensor devices in a short time. This is also related to the fact that these pressure sensor devices can be produced and processed using standard machines commonly used in the fabrication of semiconductors, in particular of MEMS modules, and in their assembly to form measurement modules.

Advantageously, electrical accesses of the pressure sensor device can be situated on a side of the pressure sensor housing that faces away from another side of the housing at which a pressure inlet is situated. In other words, the pressure sensor device can be connected at a first side to a medium whose pressure is to be sensed, while signals of the pressure sensor device can be picked off at the side of the pressure sensor housing oriented away from the medium. In addition, the electrical accesses can then easily be wired.

After the filling with the incompressible fluid, the relevant filling opening in the pressure sensor housing can be closed and sealed by a ball-press seal.

In order to minimize the fluid volume of incompressible liquid in the interior of the pressure sensor housing, in advantageous developments of the method according to the present invention at least one filling element, preferably a plurality of filling elements, can be situated between one or more housing regions of the pressure sensor housing and the sensor element. These can be plastic, ceramic, or metallic parts that can also be referred to as spacers. Preferably, in a further variant, for example a filling element or a plurality of filling elements inside the pressure sensor housing can then form a closed structure, possibly together with the sensor element.

An example measuring device according to the present invention is also provided. Preferably, a sealing means (a seal), for example an O-ring, can be situated between the edge region and the flange.

With regard to further features and advantages, reference is made to the above statements concerning the pressure sensor system according to the present invention and its production method.

Where appropriate, the embodiments and developments described above can be combined with one another as desired. Further possible embodiments, developments, and implementations of the present invention also include combinations not explicitly named of features of the present invention described above or in the following with regard to the exemplary embodiments. In particular, the person skilled in the art will also add individual aspects as improvements or supplementation to the respective basic form of the present invention.

Below, the present invention is explained in more detail on the basis of exemplary embodiments shown in the figures.

BRIEF DESCRIPTION OF EXAMPLE EMBODIMENTS

FIG. 1 shows a schematic representation of a pressure sensor device of a first specific embodiment of a pressure sensor system, in an initial sketch.

FIG. 2a-d show various perspective representations of a specific embodiment of the pressure sensor system.

In all the Figures, identical or functionally identical elements and devices have been provided with the same reference characters, unless otherwise indicated.

DETAILED DESCRIPTION OF EXAMPLE EMBODIMENTS

Figure 1:
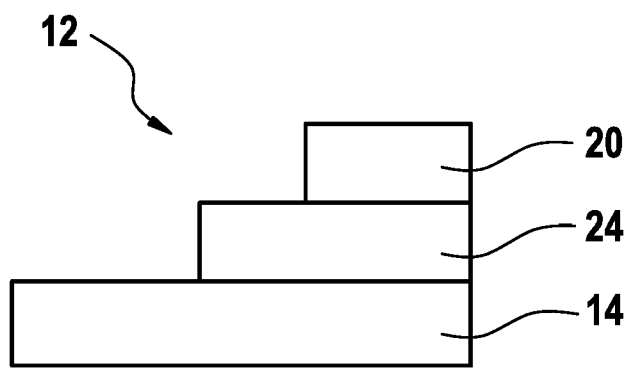

FIG. 1 shows a schematic representation of a pressure sensor device 12 of a pressure sensor system 10, in an initial sketch, according to a specific embodiment. Here a ceramic substrate 14 can be seen that is stacked with a signal processing element 24 that can be realized in particular as an application-specific integrated circuit, or ASIC. A sensor element 20, in particular an APSM sensor element 20, i.e., an Advanced Porous Silicon MEMS sensor element, is connected or stacked with signal processing element 24, so that in the resulting stack signal processing element 24 is sandwiched between sensor element 20 and ceramic substrate 14 so as to create pressure sensor device 12.

FIGS. 2a-2d show various schematic and perspective views of the finished pressure sensor system 10. Pressure sensor system 10 provides protection of pressure sensor device 12 of FIG. 1 from aggressive media through the situation of pressure sensor device 12 in a sensor housing 30, the sensor housing 30 being closed and sealed, after the situation of pressure sensor device 12, through the situation of a membrane 32.

Figure 2A:
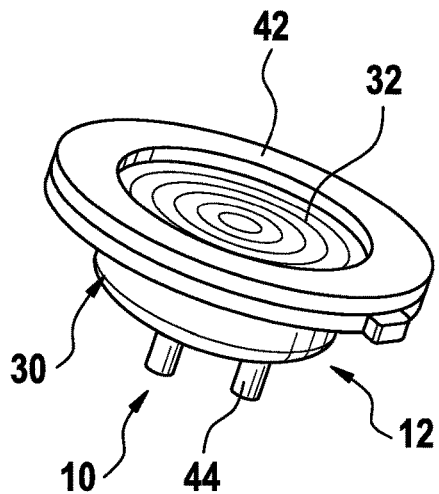
Figure 2B:
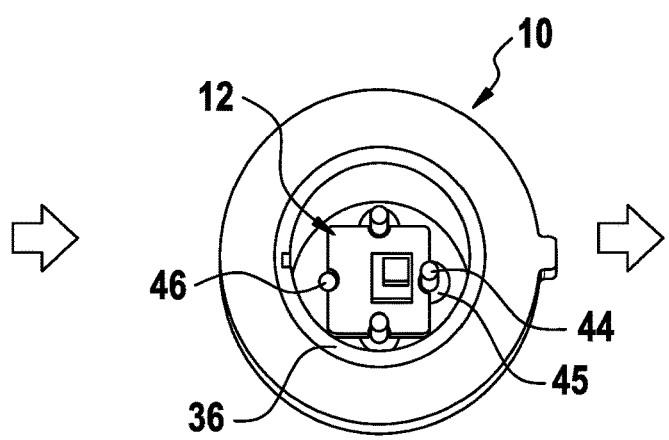

FIG. 2a shows sensor housing 30, over whose opening membrane 32 is positioned, and in FIG. 2b the same sensor housing 30 is shown with membrane 32 removed, so that pressure sensor device 12 situated behind it can be seen. As shown in FIG. 2b, flat ceramic substrate 14 can have, at its edges, at least one semicircular recess in which metallic contact pins 44 can engage that are insulated, by a respective annular glass insulation 45, from the likewise metallic sensor housing when pressure sensor device 12 is situated in sensor housing 30, in order to secure ceramic substrate 14 particularly well against shifting.

Metallic contact pins 44 can for example be electrically connected, by wire bonds, to terminals on signal processing element 24 and/or pressure sensor device 12. In this way, sensor signals from pressure sensor device 12 and/or processed signals from signal processing element 24 can be picked off at the outer side of sensor housing 30 via segments of contact pins 44 protruding from sensor housing 30 (as shown in FIG. 2a).

FIG. 2b shows that ceramic substrate 14 can have a rectangular, in particular square, shape, and can have a recess in the shape of a circular arc, in particular semicircular, at each of its four edges, preferably in the center. Pressure sensor system 10 is provided in FIG. 2b with three contact pins 44, each of which engages in one of the three recesses. Of course, pressure sensor system 10 can also have more or fewer than three contact pins 44, and the ceramic substrate can be made with at least as many recesses as there are contact pins 44. In this way, on the one hand electrical connection paths between pressure sensor device 12 and contact pins 44 can be reduced, and on the other hand a very good fastening of ceramic substrate 14 in sensor housing 30 can be achieved, in that contact pins 44 act as supports for ceramic substrate 14.

Figure 3:
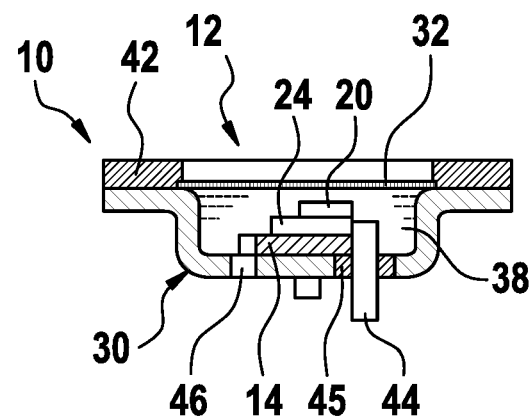
FIG. 3 show a sectioned side view of the specific embodiment of FIGS. 2a-2d.

FIG. 2b also shows that the fourth recess in ceramic substrate 14 does not include a contact pin 44, but rather is made adjacent to an opening 46 and the housing (see also FIG. 3). A filling of the residual volume of the sensor housing 30 with an incompressible fluid, e.g. an oil, after the introduction of pressure sensor device 12 can be done through opening 46. The recess in ceramic substrate 14 enables a particularly space-saving configuration of opening 46, namely without having to leave, in sensor housing 30, a particularly large open space next to ceramic substrate 14 just for opening 46, which would enlarge the residual volume.

Figure 2C:
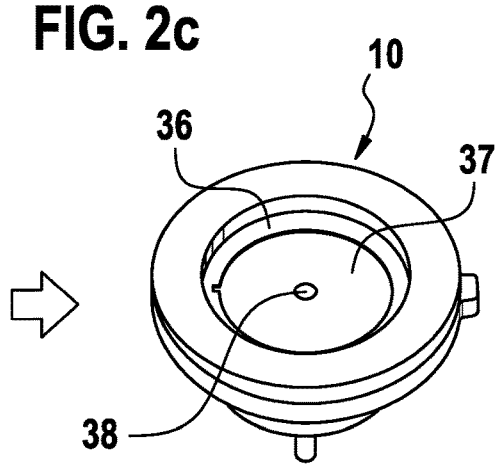

A first, substantially annular, filling element 36 is optionally placed in sensor housing 30. As shown in FIG. 2c, in which membrane 32 is not shown, a substantially circular disk-shaped filling element 37, having a central passage 38, can in addition be set into first filling element 36. Between membrane 32 and filling elements 36 and 37 there remains a flat residual volume that, together with the residual volume below filling elements 36, 37 around pressure sensor device 12, is filled with the incompressible fluid. As a result, the residual volume to be filled with the incompressible fluid is further reduced overall.

A pressure fluctuation, or a pressure signal, can be transmitted from the outside onto membrane 32, and from there to the incompressible fluid between membrane 32 and filling elements 36, 37, and then, through passage 38 inside the incompressible fluid, into the space below filling elements 36, 37, and from there to the at least one sensor element 20.

Figure 2D:
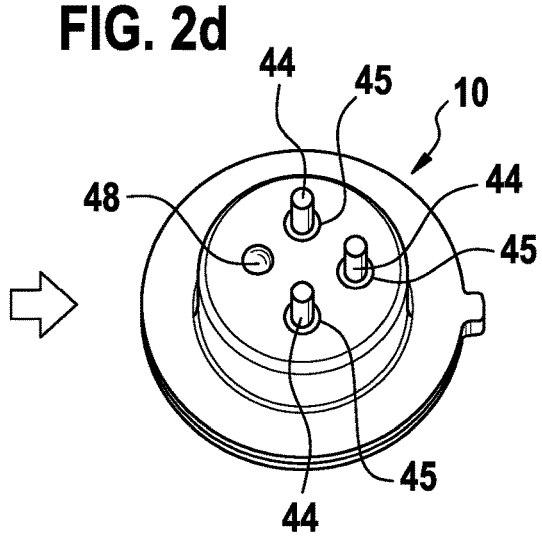

After the filling of the residual volume in sensor housing 30, opening 46 used for the filling can be closed, e.g. by a ball-press seal 48, as shown in FIG. 2d, which shows sensor housing 30 from the side facing away from membrane 32.

FIG. 3 shows a cross-sectional view of pressure sensor system 10 of FIGS. 2a-d. FIG. 3 again shows pressure sensor device 12, surrounded by oil filling 38 and situated in sensor housing 30. Membrane 32, which communicates the pressure from outside to sensor element 20 via oil filling 38, is held on sensor housing 30 by a housing ring 42. The electrical contacting of pressure sensor device 12 is led to the outside by metallic contact pins 44.

Figure 4:
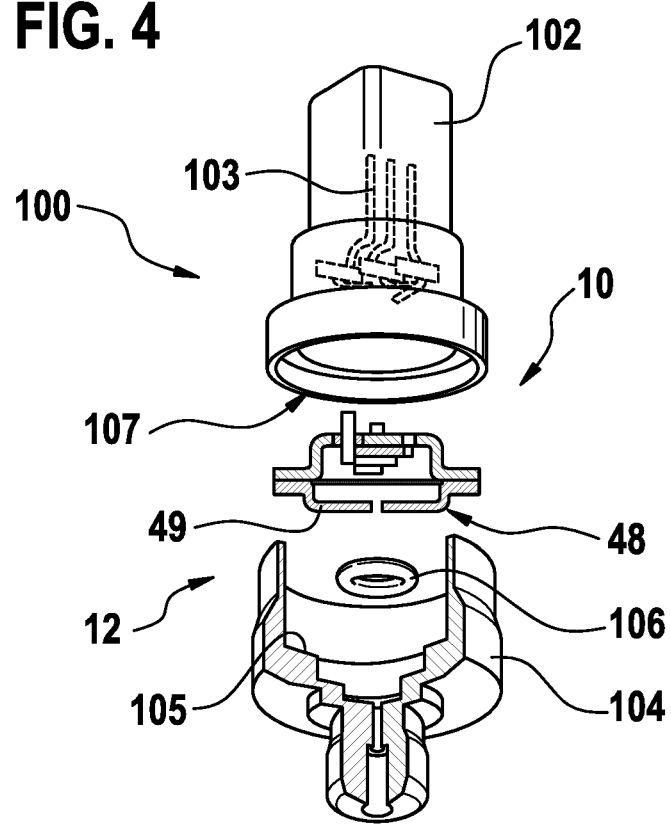
FIG. 4 show an exploded perspective side view of a specific embodiment of a measuring device according to the present invention, in which a pressure sensor system according to the present invention is integrated in media-robust fashion in a so-called second-level housing, for applications in the automotive sector.

Finally, FIG. 4 shows an exemplary embodiment of a pressure sensor system 10 as a media-robust sensor packet situated in a measuring device 100 of an automotive application, forming a so-called second-level package. Here, pressure sensor system 10 is accommodated in a receptacle 107 of a plug housing 102 whose electrical contacts 103, in the position of use, are contacted with contact pins 44 of sensor housing 30. For the mechanical protection of its membrane 32, pressure sensor system 10 has a protective element 48 in the form of a perforated plate 49 situated at the end face and connected to sensor housing 30. Protective element 48 of sensor housing 30 of pressure sensor system 10 is oriented towards connecting piece 104 of the packet, whose surface oriented towards pressure sensor system 10 forms a flange 105 on which pressure sensor system 10 is supported. A sealing means 106, in the form of an O ring, is situated between these two elements.

Accordingly, the present invention described above relates to a pressure sensor system 10 having at least one pressure sensor device 12 that has a stack having a ceramic substrate 14, at least one signal processing element 24, and at least one sensor element 20. Pressure sensor device 12 is housed in a sensor housing 30 provided with a membrane 32. A residual volume of sensor housing 30 provided with membrane 32 is filled with an incompressible fluid.

The described pressure sensor system 10 enables a protection of pressure sensor device 12, with its sensor element 20 (in particular an APSM sensor element) and with signal processing element 24 (in particular an ASIC), against aggressive media, by placing it in an oil filling of sensor housing 30. Pressure sensor system 10, having at least one pressure sensor device 12, is on the one hand therefore made robust, or protected, against aggressive media, while on the other hand a simple temperature compensation is possible therein for compensating the influence of the oil filling via the temperature; moreover, the system can be produced at low cost. It turns out that the relevant pressure sensor system 10 can be used particularly advantageously in an average pressure range between 5 bar and approximately 70 bar without incurring the risk of damage. Through the embedding of pressure sensor device 12 in the oil filling of pressure sensor system 10, this is possible even when the individual pressure sensor device 12 in itself is designed, as may be the case, only for low pressures of less than 10 bar, in particular less than 5 bar.

Ceramic substrate 14 brings about an advantageous thermal and mechanical decoupling of signal processing element 24 and sensor element 20 from sensor housing 30.

Although the present invention has been described above on the basis of preferred exemplary embodiments, it is not limited thereto, but rather can be modified in many ways.

What is claimed is:

1. A pressure sensor system, comprising:
   a sensor housing provided with a membrane; and
   at least one pressure sensor device, including: a stack, the stack including a ceramic substrate, at least one signal processing element, and at least one sensor element,
   wherein the pressure sensor device is situated in the sensor housing, a residual volume of the sensor housing, provided with the membrane, being filled with an incompressible fluid,
   wherein the sensor element includes a surface facing away from the ceramic substrate, the surface facing the membrane and being situated at a distance from the membrane,
   wherein the incompressible fluid is situated between the surface of the sensor element and the membrane, and surrounds the stack at least laterally, and
   wherein the at least one signal processing element is situated between the ceramic substrate and the at least one sensor element.

2. The pressure sensor system as recited in claim 1, wherein the sensor element includes an advanced porous silicon MEMS sensor element.

3. The pressure sensor system as recited in claim 1, wherein the at least one signal processing element includes an ASIC.

4. The pressure sensor system as recited in claim 1, further comprising:
   a mechanical protective element that covers the membrane substantially indirectly, and is situated on a side of the membrane facing away from the sensor housing.

5. The pressure sensor system as recited in claim 1, wherein the incompressible fluid includes a synthetic oil.

6. A method for producing a pressure sensor system, the method comprising:
   producing a pressure sensor device, including stacking a ceramic substrate, a signal processing element, and a sensor element, the signal processing element being situated between the ceramic substrate and the sensor element;
   placing the pressure sensor device into a pressure sensor housing;
   filling a residual volume remaining in the pressure sensor housing after the placement of the pressure sensor device with an incompressible fluid; and
   closing the pressure sensor housing with a membrane and/or a ball-press seal;
   wherein at least one filling element is situated between one or more housing regions of the pressure sensor housing and the pressure sensor device to reduce the residual volume to be filled with the incompressible fluid.

7. A measuring device, comprising:
   at least one pressure sensor system, including:
      a sensor housing provided with a membrane, and
      at least one pressure sensor device including: a stack, which includes a ceramic substrate, at least one signal processing element, and at least one sensor element,
      wherein the pressure sensor device is situated in the sensor housing, a residual volume of the sensor housing being provided with the membrane being filled with an incompressible fluid,
      wherein the sensor element includes a surface facing away from the ceramic substrate, the surface facing the membrane and being situated at a distance from the membrane,
      wherein the incompressible fluid is situated between the surface of the sensor element and the membrane, and surrounds the stack at least laterally, and
      wherein the at least one signal processing element is situated between the ceramic substrate and the at least one sensor element;
   wherein the measuring device is provided with a number of recesses corresponding to the number of pressure sensor systems, in which recess or recesses the at least one pressure sensor system is accommodated, in a position of use, so that the pressure sensor system is supported, by an edge formed by a housing ring, on a flange of a connecting piece of the measuring device.

8. The measuring device as recited in claim 7, further comprising:
   a sealing situated between the housing ring of the pressure sensor system and the flange of the connecting piece.

9. The measuring device as recited in claim 8, wherein the seal includes an O-ring.

10. The measuring device as recited in claim 7, wherein the sensor element includes an advanced porous silicon MEMS sensor element.

11. The measuring device as recited in claim 7, wherein the at least one signal processing element includes an ASIC.

12. The measuring device as recited in claim 7, wherein the pressure sensor system includes a mechanical protective element that covers the membrane substantially indirectly, and is situated on a side of the membrane facing away from the sensor housing.

13. The measuring device as recited in claim 7, wherein the incompressible fluid includes a synthetic oil.

* * * * *